Patented June 3, 1947

2,421,408

UNITED STATES PATENT OFFICE 2,421,408

THERMOPLASTIC POLYVINYL HALIDE COMPOSITION CONTAINING CHLORINATED PARAFFIN WAX

Ernest Francis Brookman and Stephen Frederick Pearce, Welwyn Garden City, England, assignors to Imperial Chemical Industries Limited, a corporation of Great Britain No Drawing. Application April 1, 1943, Serial No. 481,497. In Great Britain May 7, 1942

6 Claims. (Cl. 260—28)

This invention relates to thermoplastic compositions and to shaped articles manufactured from such compositions. More particularly, it relates to such compositions and articles based upon polyvinyl halides.

Polyvinyl halides and, in particular, polyvinyl chloride have recently been much proposed and much used as a basis for thermoplastic compositions, and when used in this manner it has been found desirable to introduce into the polyvinyl chloride a proportion of one or more plasticisers, so as to lower the "plastic temperature range" to a point where thermal decomposition of the polymer is substantially avoided. Many plasticisers have been proposed for this purpose, especially high-boiling esters e. g. tricresyl phosphate and dibutyl phthalate, and the addition of such materials has provided compositions capable of being shaped with comparative ease. On the other hand, the introduction of these plasticisers, in proportions sufficient to promote ready shaping, has produced materials possessing a permanent flexibility which is undesirable for some purposes. Furthermore, the introduction of said plasticisers, in proportions low enough to produce a rigid composition, leads to compositions which do not shape readily and which, in particular, extrude with great difficulty.

The object of this invention is to provide substantially rigid compositions based upon polyvinyl halides, which composition are, nevertheless capable of being readily shaped, more particularly, by extrusion.

We have now found that the above objects are accomplished by providing a composition comprising one or more vinyl halide polymers in substantially homogeneous admixture with one or more plasticisers and with chlorinated paraffin wax having a chlorine content of 10%–55% by weight, or with such wax alone, 100 parts of said composition containing 70–99.5 parts of polymer, not more than 12.5 parts of plasticiser, not less than 0.5 parts of chlorinated wax and, when no plasticiser is present, not more than 5 parts of chlorinated wax, the plasticiser/wax weight ratio being never greater than 10 and never less than any positive value of the expression (2.28–0.024 N) where N is the number of parts of polymer in 100 parts of said composition.

By the term "vinyl halide polymer" we mean polyvinyl chloride, bromide or iodide or interpolymers of these vinyl halides with vinyl acetate, methyl acrylate, methyl methacrylate, methyl alphachloracrylate, styrene, or vinylidene chloride the interpolymer being derived from a mixture which contains not more than 20% by weight of the non-vinyl halide ingredient. More than one vinyl halide polymer may be present in a composition.

Our novel compositions may be produced by mixing the ingredients by any of the known methods for producing polyvinyl chloride extrusion or moulding compositions e. g. by milling on hot rolls, or in a Bridge-Banbury type of mixer.

Preferably, the ingredients are thoroughly premixed at room temperature and the resultant mixture homogenised on hot rolls.

As polyvinyl halide, we use preferably polyvinyl chloride. The plasticiser or mixture of plasticisers may be selected from those plasticisers known to be suitable for use with polyvinyl halides, but preferably, we use dibutyl phthalate or tricresyl phosphate or a mixture thereof.

The chlorinated paraffin wax may be one or more of any known commercial materials provided that its chlorine content is 10–55% by weight, although we preferably use a chlorinated wax containing 30–50% chlorine by weight.

The compositions herein proposed are rigid at room temperature and remain substantially rigid at temperatures up to about 45–85° C. depending upon the percentage plasticiser and chlorinated wax used. Despite this rigidity, however, they may readily be shaped, e. g. by moulding, pressing, or extruding in known manner, at temperatures of the order of 160–180° C. and the shaped articles produced show excellent gloss and surface-finish.

In order that our invention may be better understood, we give the following by way of example, it being understood that our invention is in no way limited thereby. The parts are by weight. The impact-strength figures were obtained by the method set out in British Standards Specification 771.

Example I

A composition was prepared by pre-mixing the following ingredients at room temperature and subsequently mixing on hot rolls at 130° C.

| | Parts |
|---|---|
| Polyvinyl chloride | 100 |
| Tricresyl phosphate | 5 |
| Chlorinated paraffin wax (34% Cl by weight) | 5 |

The product was a rigid sheet which could be readily shaped at 160–170° C. by compression moulding or by extrusion to form shaped articles having excellent surface-finish and gloss. The mechanical properties of the above composition were as follows:

Tensile strength _____lbs./sq. in__ 6300–6600
Impact strength_____ft. lbs__ 0.28

Example II

The following ingredients were mixed in identical manner with that described in Example I.

| | Parts |
|---|---|
| Polyvinyl chloride | 100 |
| Chlorinated paraffin-wax (47% Cl by weight) | 5 |

The composition obtained was similar in appearance and behaviour to the product of Example I and had the following mechanical properties.

Tensile strength_____lbs./sq. in__ 7500
Impact strength_____ft. lbs__ 0.43

Example III

The following ingredients were mixed in identical manner with that described in Example I.

| | Parts |
|---|---|
| Polyvinyl chloride | 100 |
| Chlorinated paraffin-wax (42.0% Cl by weight) | 2 |

The composition obtained was similar in appearance and behaviour to the product of Example I and had the following mechanical properties.

Tensile strength_____lbs./sq. in__ 7900
Impact strength_____ft. lbs___ 0.38

Example IV

The following ingredients were mixed in identical manner with that described in Example I.

| | Parts |
|---|---|
| Polyvinyl chloride | 100 |
| Dibutyl phthalate | 3 |
| Chlorinated paraffin wax (47% Cl) | 2 |

The composition obtained was similar in appearance and behaviour to the product of Example I and had the following mechanical properties.

Tensile strength_____lbs./sq. in__ 6500
Impact strength_____ft. lbs__ 0.55

Example V

| | Parts |
|---|---|
| A 95/5 vinyl chloride/vinyl acetate interpolymer | 100 |
| Tricresyl phosphate | 5 |
| Chlorinated paraffin wax (34% chlorine) | 5 |
| Stabiliser, filler and pigment | 7.5 | were mixed in an identical manner with that described in Example I. The composition obtained was similar in appearance and behaviour to the product of Example I and had the following mechanical properties:

Tensile strength_____lbs./sq. in__ 7500
Impact strength_____ft. lbs__ 0.5

Any of the customary pigments, fillers and stabilisers may be incorporated in our newly proposed compositions, and compositions containing such bodies are within the scope of our invention, it being understood that where pigments, fillers, stabilisers or the like are incorporated, the relative proportions of polymer, plasticiser and chlorinated wax are defined in the manner already set out without reference to the weight of other ingredients present.

Having now particularly described and ascertained the nature of our said invention and in what manner the same is to be performed we declare that what we claim is:

1. A polyvinyl halide composition which is substantially rigid at a temperature of 45–85° C. and which can be shaped by extrusion at a temperature of 160–180° C., which comprises 70–99.5% by weight of vinyl halide polymer in substantially homogeneous admixture with not to exceed 12.5% by weight of a plasticizer, and a chlorinated paraffin wax containing 30–50% by weight of chlorine in an amount equal to not less than 0.5% by weight and not more than 5% by weight when substantially no plasticizer is present, the weight ratio of said plasticizer to said wax being equal to not more than 10 and not less than any positive value of the expression $(2.28-0.024 N)$, wherein $N$ is the per cent by weight of said polymer.

2. A polyvinyl halide composition which is substantially rigid at a temperature of 45–85° C. and which can be shaped by extrusion at a temperature of 160–180° C., which comprises 95% to 99.5% by weight of vinyl halide polymer in substantially homogeneous admixture with 0.5 to 5% by weight of a chlorinated paraffin wax containing 30–50% by weight of chlorine.

3. A polyvinyl halide composition which is substantially rigid at a temperature of 45–85° C. and which can be shaped by extrusion at a temperature of 160–180° C., which comprises at least 70% but less than 99.5% by weight of a vinyl chloride polymer in substantially homogeneous admixture with 0.5 to 5% by weight of a chlorinated paraffin wax containing 30–50% by weight of chlorine, and an amount of a plasticizer, not exceeding 12.5% by weight, such that the weight ratio of said plasticizer to said wax is not greater than 10 and not less than any positive value of the expression $(2.28-0.024 N)$, wherein $N$ is the per cent by weight of said polymer.

4. A polyvinyl halide composition which is substantially rigid at a temperature of 45–85° C. and which can be shaped by extrusion at a temperature of 160–180° C., which comprises 95% to 99.5% by weight of polyvinyl chloride in substantially homogeneous admixture with 0.5 to 5% by weight of a chlorinated paraffin wax containing 30–50% by weight of chlorine.

5. A polyvinyl halide composition which is substantially rigid at a temperature of 45–85° C. and which can be shaped by extrusion at a temperature of 160–180° C., which comprises at least 70% but less than 99.5% by weight of a vinyl halide polymer in substantially homogeneous admixture with not less than 0.5% by weight of a chlorinated paraffin wax containing 30–50% by weight of chlorine, and an amount of tricresyl phosphate, not exceeding 12.5% by weight, such that the weight ratio of said phosphate to said wax is not greater than 10 and not less than any positive value of the expression $(2.28-0.024 N)$, wherein $N$ is the per cent by weight of said polymer.

6. A polyvinyl halide composition which is substantially rigid at a temperature of 45–85° C. and which can be shaped by extrusion at a temperature of 160–180° C., which comprises at least 70% but less than 99.5% by weight of a vinyl halide polymer in substantially homogeneous admixture with not less than 0.5% by weight of a chlorinated paraffin wax containing 30–50% by weight of chlorine, and an amount of dibutyl phthalate, not exceeding 12.5% by weight, such that the weight ratio of said phthalate to said wax is not greater than 10 and not less than any positive value of the expression (2.28–0.024 N), wherein N is the per cent by weight of said polymer.

ERNEST FRANCIS BROOKMAN.
STEPHEN FREDERICK PEARCE.

REFERENCES CITED

The following references are of record in the file of this patent:

UNITED STATES PATENTS

| Number | Name | Date |
|---|---|---|
| 2,111,395 | Hartwick | Mar. 15, 1938 |
| 2,252,485 | Hull | Aug. 12, 1941 |
| 2,174,164 | Pellerano | Sept. 26, 1939 |
| 2,307,057 | Mitchell | Jan. 5, 1943 |
| 1,932,889 | Groff | Oct. 31, 1933 |

FOREIGN PATENTS

| Number | Country | Date |
|---|---|---|
| 654,118 | Germany | Dec. 10, 1937 |
| 669,385 | Germany | Dec. 28, 1938 |

OTHER REFERENCES

Carbide and Carbon Chemical Corporation, "Vinylite Copolymer Resins for Surface Coating," 1942, Table 3. (Copy in Division 50.)

Carbide and Carbon Chemical Corporation, "Vinylite Copolymer Resins for Surface Coating," 1942, page 26. (Copy in Division 50.)

Carbide and Carbon Chemical Corporation, "Vinylite Copolymer Resins for Surface Coating," 1942, pp. 1 and 27. (Rec'd in Division 50; February 1, 1943.)

Plastics Catalogue, copyright 1942, rec'd by U. S. Patent Office Library, February 25, 1943, published by Plastics Catalogue Corporation, New York, N. Y., page 258. (Copy in Division 50.)